US00RE44609E

(19) United States
(12) Reissued Patent
Robertson

(10) Patent Number: US RE44,609 E
(45) Date of Reissued Patent: Nov. 26, 2013

(54) SHOCK ABSORBER ASSEMBLY

(76) Inventor: Graeme Kershaw Robertson, Yandina (AU)

(21) Appl. No.: 13/080,921

(22) Filed: Apr. 6, 2011

Related U.S. Patent Documents

Reissue of:
(64) Patent No.: 7,513,490
Issued: Apr. 7, 2009
Appl. No.: 10/567,947
PCT Filed: Aug. 12, 2004
PCT No.: PCT/AU2004/001077
§ 371 (c)(1),
(2), (4) Date: Feb. 10, 2006
PCT Pub. No.: WO2005/015384
PCT Pub. Date: Feb. 17, 2005

(30) Foreign Application Priority Data

Aug. 12, 2003 (AU) ..... 2003904272

(51) Int. Cl.
*F16F 9/14* (2006.01)

(52) U.S. Cl.
USPC ..... 267/64.15; 188/315; 188/318; 188/322.2

(58) Field of Classification Search
USPC ..... 188/282.2–282.6, 282.9, 300, 315, 317, 188/318, 319.1, 319.2, 322.15–322.22; 267/64.12, 64.15, 119, 120, 126
See application file for complete search history.

(56) References Cited

U.S. PATENT DOCUMENTS

| | | | | | |
|---|---|---|---|---|---|
| 2,159,040 | A | * | 2/1939 | Binder et al. | 188/298 |
| 2,348,160 | A | * | 5/1944 | Thornhill | 267/64.15 |
| 2,570,362 | A | | 10/1951 | Mercier | |
| 2,748,898 | A | * | 6/1956 | Bourcier | 188/317 |
| 3,083,000 | A | | 3/1963 | Perdue | |
| 3,593,977 | A | * | 7/1971 | Hahn | 267/64.19 |
| 3,647,239 | A | | 3/1972 | Katsumori | |
| 3,820,772 | A | | 6/1974 | Kerr et al. | |
| 3,833,248 | A | * | 9/1974 | Wossner et al. | 293/134 |
| 3,853,311 | A | * | 12/1974 | Kreuzer et al. | 267/64.26 |
| 3,882,977 | A | * | 5/1975 | Watanabe | 188/322.14 |
| 4,078,638 | A | | 3/1978 | Koyama et al. | |
| 4,153,145 | A | * | 5/1979 | Ellis et al. | 188/274 |
| 4,381,857 | A | | 5/1983 | Cook | |
| 4,428,567 | A | | 1/1984 | Fournales | |

(Continued)

FOREIGN PATENT DOCUMENTS

| | | | |
|---|---|---|---|
| AU | 2003203440 | A1 | 6/2003 |
| DE | 35 43 156 | A1 | 6/1987 |

(Continued)

*Primary Examiner* — Christopher Schwartz
(74) *Attorney, Agent, or Firm* — Cascio & Zervas

(57) ABSTRACT

A shock absorber assembly includes a motion damping means that is filled with a fluid in operation and has a pair of relatively moveable parts (12, 14) and valve means (26) permitting flow of the fluid between the parts. The parts comprise a first part (12) and a second part (14) in which the first part is receivable whereby the parts are arranged for relative retracting and extending movement during which fluid is forced through the valve means (26) at respective predetermined controlled flow rates so as to dampen the movement. The relatively moveable parts contain respective primary chambers (24, 29) for the fluid. The first part is substantially smaller in cross-section than the second part to define an intermediate chamber (52) about the first part within the second part. Lateral port means (56) communicates the intermediate chamber (52) and the primary chamber (24) of first part (12). The flows at respective predetermined controlled flow rates are limited to respective flows (i) directly from the primary chamber (24) of the first part (12) to the primary chamber (29) of the second part (14) and (ii) via the intermediate chamber (52) and lateral port means (56) from the primary chamber (29) of the second part (14) to the primary chamber (24) of the first part (12).

24 Claims, 3 Drawing Sheets

(56) References Cited

U.S. PATENT DOCUMENTS

| | | | | |
|---|---|---|---|---|
| 5,174,598 | A | 12/1992 | Sato et al. | |
| 5,178,239 | A * | 1/1993 | Homme | 188/315 |
| 5,277,283 | A * | 1/1994 | Yamaoka et al. | 188/282.2 |
| 5,384,706 | A | 1/1995 | Uchiyama et al. | |
| 2,724,590 | A | 11/1995 | Irwin | |
| 6,152,432 | A * | 11/2000 | Perrin | 267/64.15 |
| 6,311,961 | B1 * | 11/2001 | Julia | 267/64.17 |
| 6,352,145 | B1 * | 3/2002 | DeMolina et al. | 188/281 |
| 6,371,264 | B1 * | 4/2002 | Deferme | 188/322.15 |
| 6,668,987 | B2 * | 12/2003 | Bataille et al. | 188/282.5 |

FOREIGN PATENT DOCUMENTS

| | | | |
|---|---|---|---|
| DE | 38 13 021 | A1 | 11/1989 |
| EP | 0 882 907 | A1 | 12/1998 |
| GB | 2 196 092 | A | 4/1988 |
| GB | 2 321 687 | A | 5/1998 |
| GB | 2321687 | A | 8/1998 |
| JP | 10-86627 | | 4/1998 |
| SU | 645881 | A | 2/1979 |

* cited by examiner

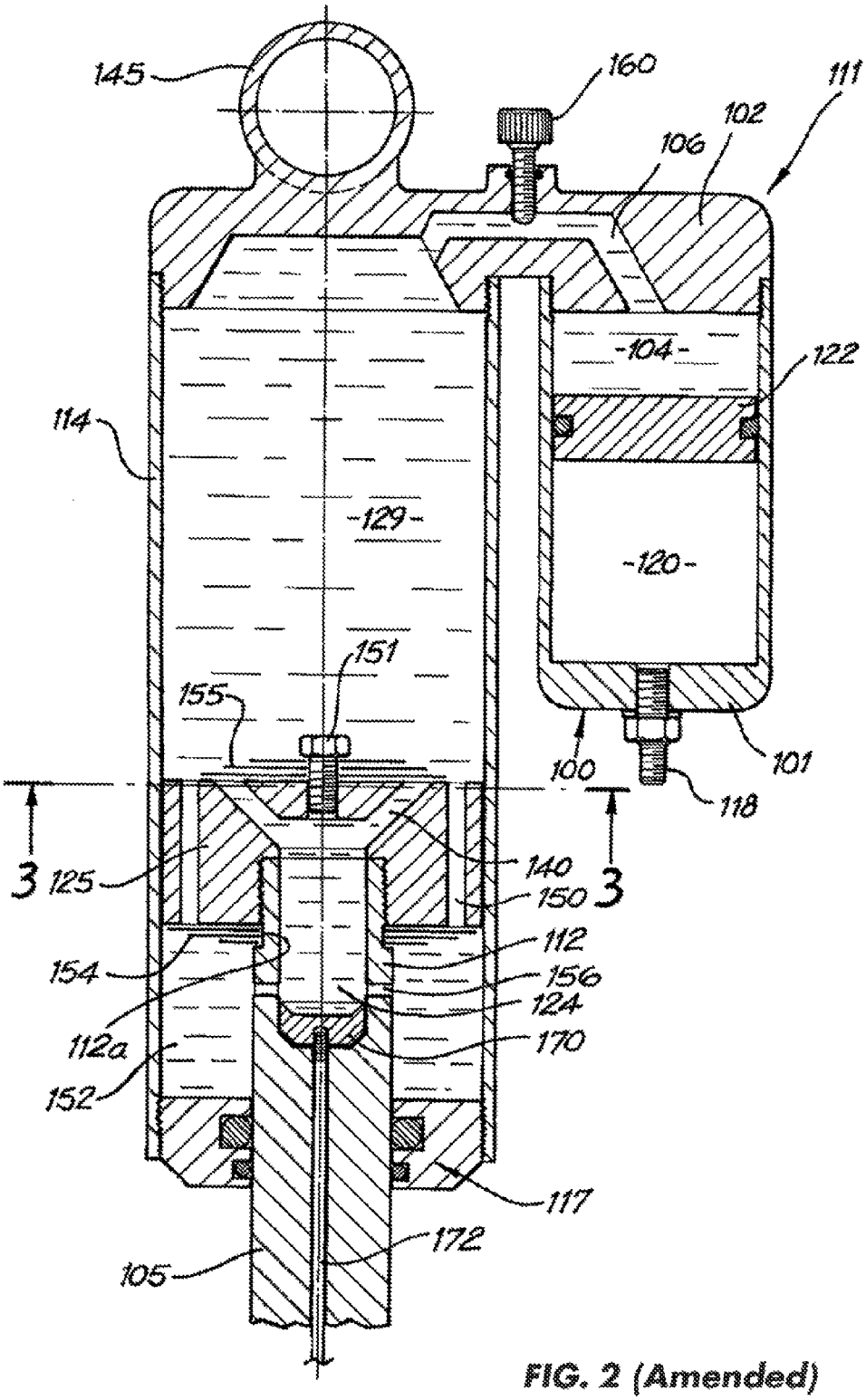
FIG. 2 (Amended)

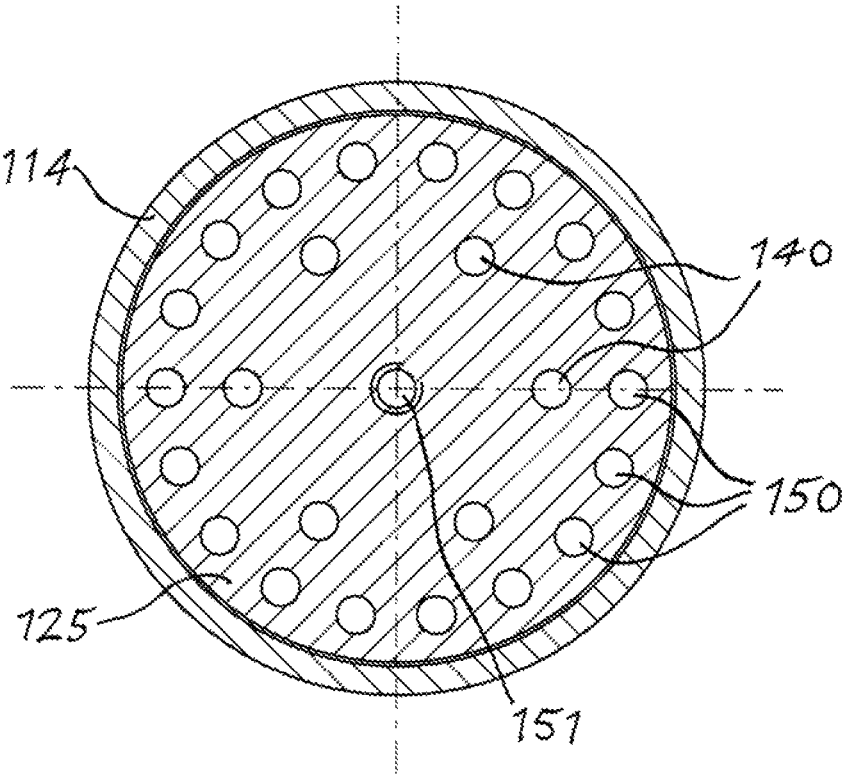
FIG. 3 (New)

SHOCK ABSORBER ASSEMBLY

Matter enclosed in heavy brackets [ ] appears in the original patent but forms no part of this reissue specification; matter printed in italics indicates the additions made by reissue.

FIELD OF THE INVENTION

This invention relates generally to shock absorbers but is particularly useful for shock absorber assemblies in vehicle suspension systems, especially in heavy duty applications such as trucks and industrial vehicles, and off-road racing vehicles. The invention will primarily be described in this context in this specification but it will be understood that the invention is broadly applicable to shock absorbers in general. Other applications include motorcycles, industrial machinery, industrial switch gear systems, and suspension systems for seats, particularly vehicle seats, truck cab suspensions or the like.

BACKGROUND ART

Vehicle suspension systems fall into a variety of broad sub-classes according to the mechanism by which motion is damped and smoothed. One such sub-class relies on a fluid system in which a suitable, typically substantially incompressible, fluid is forced through one or more valve devices at one or more predetermined controlled rates so as to dampen a relative movement, typically a reciprocal telescopic movement, between two components. The valve devices are typically double-acting and so are relatively complex, requiring separate ducting and separate one-way valving for each direction of flow. Resiliently deformable or axially moveable shim packs are a typical form of one-way valving, while flow passages for the two directions of flow are commonly accommodated in a single valve body.

It is an object of the invention to provide an improved shock absorber assembly of the type having a fluid damping mechanism.

SUMMARY OF THE INVENTION

The invention provides a shock absorber assembly including a motion damping means that is filled with a fluid in operation and has a pair of relatively moveable parts and valve means permitting flow of the fluid between the parts, the parts comprising a first part and a second part in which the first part is receivable whereby the parts are arranged for relative retracting and extending movement during which fluid is forced through said valve means at respective predetermined controlled flow rates so as to dampen said movement.

The relatively moveable parts contain respective primary chambers for the fluid and the first part is substantially smaller in cross-section than the second part to define an intermediate chamber about the first part within the second part. There is further included lateral port means communicating the intermediate chamber and the primary chamber of the first part. The aforesaid flows at respective predetermined controlled flow rates are limited to respective flows (i) directly from the primary chamber of the first part to the primary chamber of the second part and (ii) via said intermediate chamber and lateral port means from the primary chamber of the second part to the primary chamber of the first part.

Preferably, the first and second parts comprise telescopically interengaged tubes respectively of relatively smaller and larger diameter. Advantageously, the valve means is provided in a valve body fixed at an inner end of the tube comprising the first part. The lateral port means then conveniently comprises a plurality of spaced individual ports in the tube comprising the first part.

Preferably, the lateral port means is positioned whereby, during extending movement, the lateral port means is covered near the end of the movement, whereby fluid in the intermediate chamber cushions further extending movement.

The assembly may further include respective sets of shims in part determining the respective predetermined controlled flow rates and further determining the respective directions of flow.

The assembly preferably further includes pressurised-gas cushioning means including structure defining a first cavity for storing a pressurised gas and a second cavity for storing a fluid under pressure, and a floating piston sealingly separating the cavities, wherein the second cavity is in fluid flow communication with the motion damping means. Further preferably, said movement is such that when the aforesaid parts relatively extend, fluid is caused to flow from the second cavity of the pressurised-gas cushioning means to the damping means whereby gas pressure in the first cavity moves the floating piston to reduce the gas pressure in the first cavity, and when the parts relatively retract, fluid is caused to flow from the damping means to the second cavity whereby to move the floating piston to increase the gas pressure of the gas in the first cavity.

In one embodiment, the first part of the motion damping means and the aforesaid structure of the pressurised-gas cushioning means are integral whereby the second cavity and the primary chamber of the first part comprise a single chamber. For example, the first part of the motion damping means and the structure of the pressurised-gas cushioning means are provided by a single tube.

In an alternative embodiment, the pressurised-gas cushioning means and the motion damping means are substantially separate units and a conduit is provided for the fluid flow communication between the motion damping means and the second cavity. In one arrangement, this conduit is between the primary chamber of the first part of the motion damping means and the second cavity. Alternatively, the conduit may be between the primary chamber of the second part of the motion damping means and the second cavity.

The valve means may be such that the respective predetermined controlled flow rates in the respective directions are different whereby to vary the damping characteristics according to whether the aforesaid movement is relative retracting or extending movement.

The assembly may further include cooling means for reducing the temperature of the assembly during operation.

BRIEF DESCRIPTION OF THE DRAWINGS

The present invention will now be described, by way of example only, with reference to the accompanying drawings, in which:

FIG. 2 is a similar view of a second embodiment of the invention in which the pressurised-gas cushioning means is provided in a separate housing*; and*

*FIG. 3 is a cross sectional view taken along line 3-3 in FIG. 2.*

DESCRIPTION OF EMBODIMENTS OF THE INVENTION

Figure 1:
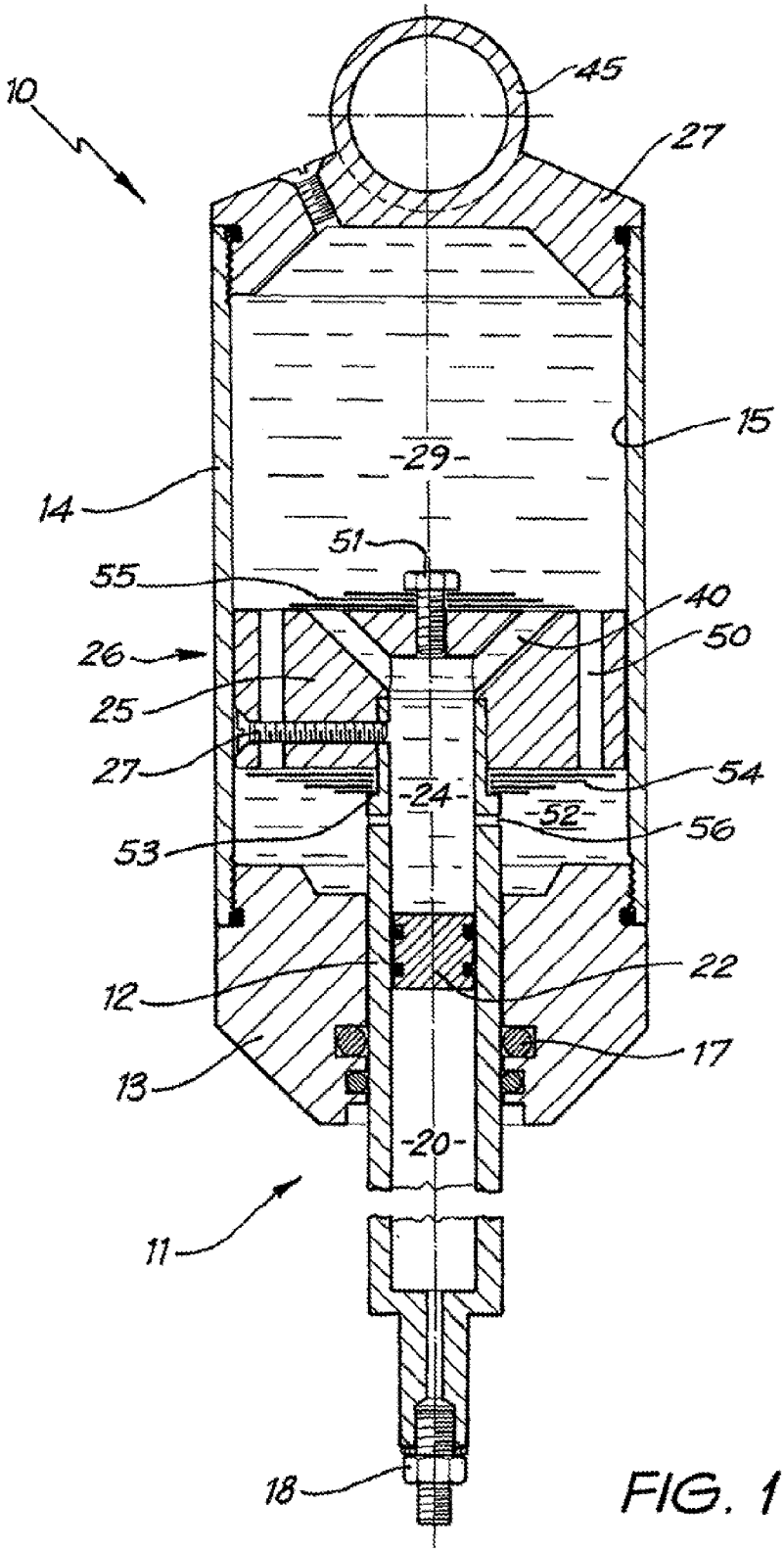
FIG. 1 is a fragmentary cross-sectional view of a shock absorber assembly according to a first embodiment of the invention, incorporating pressurised-gas cushioning means in an integrated telescopic structure; [and]

The shock absorber assembly illustrated in FIG. 1 is an integrated shock absorber unit 10 that includes pressurised-gas cushioning means 11 and would typically be one of a number of such units forming auxiliary components of a suspension system in a vehicle. The units may be acting individually or be linked in a fluid circuit to provide a managed and balanced suspension response.

Shock absorber unit 10 has a first cylindrical tube 12 received within a second cylindrical tube 14 so that the two tubes constitute mutually reciprocably moveable parts. Tube 12 is connected to tube 14 through a head 13 of tube 14 that includes a sealing configuration 17 about tube 12.

Tube 12 incorporates gas cushioning means 11 and to this end is provided, in this case at its outboard or proximal end, with a filling valve 18 for introducing gas, such as nitrogen or similar, under pressure into the tube 12 to fill a first cavity or chamber 20 located at or towards the proximal end of tube 12 for storing gas under pressure. A double sided floating piston 22 or other suitable separating element, eg. a diaphragm or the like, is provided intermediate the two ends of tube 12. The first chamber 20 is formed between filling valve 18 and piston 22. A second chamber 24 is formed between piston 22 and the inboard or distal end of tube 12. Hydraulic fluid fills the second chamber 24 of tube 12.

A double acting valve arrangement 26 is provided in a valve body 25 at or towards the inboard or distal end of tube 12. Valve body 25 slidably engages the cylindrical interior surface 15 of tube 14 and separates chamber 24 from larger chamber 29 defined within tube 14 between valve body 25 and an end cap 27 of tube 14. Elsewhere in this specification, chambers 24, 29 are referred to as the primary chambers of tubes 12, 14.

Valve arrangement 26, and tubes 12, 14 form motion damping means filled with hydraulic fluid in operation. Valve body 25 moves through the hydraulic fluid or the hydraulic fluid moves through the valve body in accordance with corresponding movement of tube 12, depending on whether the valve body 25 is fixed or free to move. Preferably, the valve arrangement is fixed about the end of tube 12 by transverse fastening screws 27.

Tube 12 is substantially smaller (an internal cross-sectional area ratio of the order of 1:12) in cross-section than tube 14 so that an intermediate variable-volume annular chamber 52 is provided within tube 14 and about tube 12 between head 13 and valve body 25. Fluid communication between chamber 24 and chamber 52 is provided by a ring of bleed ports 56 in tube 12, displaced axially from valve body 25.

The individual valving of valve arrangement 26 is such to allow fluid to flow in one direction at one rate when tube 12 moves in a first axial direction and to flow in the opposite direction at a second rate when tube 12 moves in the opposite direction. The rate of movement of fluid through the valving is dependent on the number, size and arrangement of the apertures, ports or ducts 40, 50, and on the flow control elements, in this case shim packs 54, 55, forming the actual valving within valve arrangement 26.

More specifically, when the tubes 12, 14 relatively retract, ie., during compression, fluid is forced into chamber 52 via a ring of outer ducts 50 parallel to the axis of the valve body 25 within and adjacent the periphery of the valve body, against annular non-return shim pack 54. Shim pack 54 is retained about a rebated end portion 12a of tube 12 between valve body 25 and a peripheral shoulder 53 on the tube. From chamber 52, fluid flows into chamber 24 via ports 56. On extension or rebound, shim pack 54 closes ducts 50, and fluid flows from chamber 24 into chamber 29 via a ring of oblique ports 40 of valve arrangement 26, controlled by disc-like non-return shim pack 55. Shim pack 55 is retained on the outer face of valve body 25 by an axially located bolt 51. In other embodiments, shim packs 54, 55 may be substituted by other forms of one-way or non-return valve, eg. spring-loaded ball valves.

When head 13 passes ports 56, the residual fluid in chamber 52 cushions further relative motion of tubes 12, 14, and thereby provides hydraulic top-out.

Both ends of integrated unit 10 are provided with suitable fittings such as eye 45 to enable the unit to be located in place as part of the suspension system of a motor vehicle. It is to be noted that any suitable fitting can be provided at either or both ends of this form of the unit. If necessary or desirable, one or both of tubes 12, 14 can be provided as desired with cooling fins to cool component 10 in use, or with outer cooling jackets for receiving recycled coolant to cool component 10. Additionally or alternatively, the outer surface of damping tube 14 (especially about chamber 52) is provided with removable, replaceable and/or interchangeable air cooling fins locatable around the outside of the outer wall of tube 14 for increased cooling if required.

In operation of this form of the shock absorber unit, the outboard end of damping tube 14 is fixedly located to suspension components of the wheel of a motor vehicle, or to another component which is connected either directly or indirectly to a road wheel of the vehicle, so as to act as a shock absorber for the suspension component. Thus, tube 14 moves in accordance with substantially vertical movement of the wheel over bumpy or rough terrain or the like. The outboard end of tube 12 is connected to the body work of the motor vehicle or other fixed component and is thus fixed in place.

In operation when a road wheel encounters a bump in the form of a crest or rise or similar, damping tube 14 is forced by the suspension of the wheel towards tube 12 so that the length of the combined component 10 is reduced. In turn, the inboard end of tube 12 is forced further into the body of tube 14, thereby pumping hydraulic fluid from within tube 14 through valve arrangement via ducts 50 into chamber 52, then via ports 56 into chamber 24. As the volume of fluid being forced into chamber 24 increases, piston 22 travels axially along the inside wall of tube 12 towards the outboard or proximal end of this tube thereby further compressing the gas in chamber 20 and increasing the internal pressure within component 10. This in turn offers increasing resistance to further movement of tube 14, thus limiting the amount of travel of tube 14 which in turn limits the amount of travel of the road wheel in a substantially vertically upwards direction.

When the road wheel returns to its normal position, such as for example, when rebounding or when encountering a trough or crest in the road, the length of integrated unit 10 is increased by tubes 12 and 14 telescopically expanding with respect to each other, thereby allowing fluid to move from chamber 24 into tube 14 via ducts 40. This reduces the amount of fluid in chamber 24, allowing piston 22 to move under the increased gas pressure of the compressed gas stored in chamber 20 which in turn reduces the compression or gas pressure of the gas in chamber 20. Further fluid is pumped into tube 14 until all of the pressures equilibrate. The rate at which fluid can flow through valve arrangement 26 limits the amount of travel of the road wheel in the substantially vertically downward direction.

The arrangement of valve body 25 so that fluid flow between chambers 24, 29 in one direction is via annular intermediate chamber 52, instead of directly between chambers 24 and 29 in both directions, permits a much clearer and simpler construction of the valve body. The two sets of multiple, angularly-spaced ducts 40, 50 can be radially separated rather than entwined in a common radial zone, which both simplifies construction and improves flow lines. Further simplification arises because the intake ports of each duct set are automatically clear of the shim pack fur the other duct set because of the radial spacing. The resulting improved fluid flow lines reduces heat build-up at the valving, an important benefit in heavy duty applications such as off-road vehicle racing.

A further benefit of the illustrated construction is that the clean separation of the duct and shim packs for the two directions of fluid flow permits better rebound control because of the radially distinct flow locations, and additionally permits incorporation of a cushioning hydraulic top out on the extension stroke in the manner already noted.

The presence of the high pressure gas cushioning features provides the ability to adjust the gas pressure to an appropriate level and so reduce the incidence of "bottoming out" of the suspension system. Operational parameters can also be adjusted by modifying the shim packs or varying the cross-sectional sizes and/or numbers of ducts 40, 50 and ports 56.

FIG. 2 depicts a second embodiment 110 into which the gas cushioning means is provided as a separate unit 111 in housing 100. Elements of this embodiment having counterparts in the first embodiment are indicated by like same reference numerals preceded by a "1". Tube 12 of the first embodiment has been replaced by a solid shaft 105 axially bored at one end to define a tubular segment 112 and chamber 124. Ports 156 are provided in this tubular segment 112.

Gas cushioning unit 111 comprises a generally cylindrical housing 100 with closed ends 101, 102, divided internally by a floating piston 122 into a hydraulic fluid or oil chamber 104 and a pressurised-gas chamber 120. Gas filling valve 118 for chamber 120 is provided in cylinder end 101. Chamber 104 is in open flow communication with primary fluid chamber 129 via duct 106, which opens into chamber 129 at its axial end opposite valve body 125.

It will of course be appreciated that, while FIG. 2 shows housing 100 in close proximity to tube 114, this is by no means necessary. Housing 100 might be alternatively located at a remote location, and duct 106 might then be a flexible line linking the two chambers 104, 129.

This embodiment functions in a similar manner to the first embodiment. However, the provision of the high-pressure gas cushioning in a larger diameter auxiliary chamber allows a more effective rising rate during operation, especially compared to conventional shock absorbers where the piston moves very little and so there is little change in rising rate.

In the second embodiment 110, rebound compression adjustment can be achieved by modifying shim packs 154, 155, or compression can be increased by varying the gas pressure in chamber 120 using filling valve 118. Compression can be adjusted by using adjuster restrictor 160 to vary the flow through duct 106. Rebound is adjustable by axial movement of internal end cap 170 in chamber 124, utilising rod 172, to restrict flow through ports 156.

The invention claimed is:

1. A shock absorber assembly including: a motion damping means that is filled with a fluid in operation and has a pair of relatively moveable parts and valve means permitting flow of said fluid between said parts, said parts comprising a first part and a second part in which the first part is receivable whereby the parts are arranged for relative retracting and extending movement during which fluid is forced through said valve means at respective predetermined controlled flow rates so as to dampen said movement; wherein said relatively moveable parts contain respective primary chambers for said fluid and said first part is substantially smaller in [cross-section] *cross section* than said second part to define an intermediate chamber about the first part within the second part; and wherein [there is] *the first part* further [included] *includes* lateral port means communicating said intermediate chamber and said primary chamber of the first part; and wherein said flows at respective predetermined controlled flow rates are limited to [respective] flows (i) *through a piston* directly from the primary chamber of the [first] *second* part to the [primary] *intermediate* chamber [of the second part] and (ii) [via] *from* said intermediate chamber [and] *through the* lateral port means *of the first part into the primary chamber of the first part, then through the piston* from the primary chamber of the [second] *first* part to the primary chamber of the [first] *second* part; [characterized in that said] *and wherein the* valve means includes peripheral compression ports and [a central] *at least one* rebound port *radially separated inwardly from the peripheral compression ports* such that the differences in flow rates of said compression and rebound ports provides differential fluid flow rates for [the compression and rebound stroke] *said relative retracting and extending movements of the first and second parts* of said assembly.

2. A shock absorber assembly according to claim 1 wherein said first and second parts comprise telescopically interengaged tubes respectively of relatively smaller and larger diameter.

3. A shock absorber assembly according to claim 2 wherein said valve means is provided in a valve body fixed at an inner end of the tube comprising said first part.

4. A shock absorber assembly according to claim 3 wherein said lateral port means comprises a plurality of spaced individual ports in said tube comprising said first part.

5. A shock absorber assembly according to claim 3 wherein said lateral port means is positioned whereby, during said extending movement, the lateral port means is covered near the end of the movement, whereby fluid in said intermediate chamber cushions further extending movement.

6. A shock absorber assembly according to claim 2 wherein said lateral port means comprises a plurality of spaced individual ports in said tube comprising said first part.

7. A shock absorber assembly according to claim 6 wherein said lateral port means is positioned whereby, during said extending movement, the lateral port means is covered near the end of the movement, whereby fluid in said intermediate chamber cushions further extending movement.

8. A shock absorber assembly according to claim 2 wherein said lateral port means is positioned whereby, during said extending [movemnet,] *movement* the lateral port means is covered near the end of the movement, whereby fluid in said intermediate chamber cushions further extending movement.

9. A shock absorber assembly according to claim 1, further including pressurized-gas cushioning means including structure defining a first cavity for storing a pressurized gas and a second cavity for storing a fluid under pressure, and a floating piston sealingly separating said cavities, wherein said second cavity is in fluid flow communication with said motion damping means.

10. A shock absorber assembly according to claim 9, wherein said movement is such that when said parts relatively extend, fluid is caused to flow from said second cavity of the pressurized-gas cushioning means to the damping means whereby gas pressure in said first cavity moves the floating piston to reduce the gas pressure in the first cavity, and when said parts relatively retract, fluid is caused to flow from the damping means to said second cavity whereby to move the floating piston to increase the gas pressure of the gas in the first cavity.

11. A shock absorber assembly according to claim 10 wherein said first part of the motion damping means and said structure of the pressurized-gas cushioning means are integral whereby said second cavity and said primary chamber of the first part comprise a single chamber.

12. A shock absorber assembly according to claim 10 wherein said pressurized gas cushioning means and said motion damping means are substantially separate units and a conduit is provided for said fluid flow communication between the motion damping means and said second cavity.

13. A shock absorber assembly according to claim 9, wherein said first part of the motion damping means and structure of the pressurized-gas [cushoning] *cushioning* means are integral whereby said second cavity and said primary chamber of the first part comprise a single chamber.

14. A shock absorber assembly according to claim 13, wherein said first part of the motion damping means and said structure of the pressurized-gas cushioning means are provided by a single tube.

15. A shock absorber [assmebly] *assembly* according to claim 1[.] wherein said pressurized-gas cushioning means and said motion damping means are [sustantially] *substantially* separate units and a conduit is provided for said flow communication between the motion damping means and said second cavity.

16. A shock absorber assembly according to claim 15 wherein said conduit is between the primary chamber of the first part of the motion damping means and said second cavity.

17. A shock absorber assembly according to claim 15 wherein said conduit is between the primary chamber of the second part of the motion damping means and said second cavity.

18. A shock absorber assembly according to claim 1, wherein the valve means is such that said respective predetermined controlled flow rates in the respective directions are different whereby to vary the damping characteristics according to whether said movement is relative retracting or extending movement.

19. A shock absorber assembly according to claim 1 including respective shim packs in part determining said respective predetermined controlled flow rates and further determining the respective directions of flow.

*20. A shock absorber assembly including:*

*a motion damping means that is filled with a fluid in operation and has a pair of relatively moveable parts and valve means permitting flow of said fluid between said parts, said parts comprising a first part and a second part in which the first part is receivable whereby the parts are arranged for relative retracting and extending movement during which fluid is forced through said valve means at respective predetermined controlled flow rates so as to dampen said movement;*

*wherein said relatively moveable parts contain respective primary chambers for said fluid and said first part is substantially smaller in cross-section than said second part to define an intermediate chamber about the first part within the second part;*

*and wherein the first part further includes lateral port means communicating said intermediate chamber and said primary chamber of the first part; and*

*wherein said flows at respective predetermined controlled flow rates are limited to respective flows:*

*(i) through a piston directly from the primary chamber of the second part to said intermediate chamber via an outer ring of compression ports in the piston and*

*(ii) from said intermediate chamber to the primary chamber of the second part via the lateral port means in the first part, the primary chamber of the first part and at least one rebound port in the piston, said at least one rebound port being radially separated inwardly from the outer ring of compression ports such that the differences in flow rates of said compression and rebound ports provide differential fluid flow rates for said relative retracting and extending movements of the first and second parts of said assembly.*

*21. A shock absorber assembly as claimed in claim 20, further comprising a pressurized-gas cushioning means.*

*22. A shock absorber assembly as claimed in claim 21, wherein the pressurized gas cushioning means is in fluid communication with the primary chamber of the second part, and wherein*

*said fluid flow during said relative retracting movement of the first and second parts additionally comprises fluid flow from the primary chamber of the second part to the pressurized-gas cushioning means, and*

*said fluid flow during said relative extending movement of the first and second parts additionally comprises fluid flow from said pressurized gas cushioning means to the primary chamber of the second part.*

*23. A shock absorber assembly as claimed in claim 21, wherein the pressurized gas cushioning means is integral to the first part, and wherein*

*said fluid flow during said relative retracting movement of the first and second parts additionally comprises fluid flow from the primary chamber of the second part to the pressurized-gas cushioning means via the outer ring of compression ports, the intermediate chamber and the lateral port means, and*

*said fluid flow during said relative extending movement of the first and second parts further comprises fluid flow from the pressurized gas cushioning means through the at least one rebound port to the primary chamber of the second part.*

*24. A shock absorber assembly as claimed in claim 20 wherein said valve means includes respective shim packs in part determining said respective predetermined controlled flow rates and further determining the respective directions of flow.*

* * * * *